United States Patent Office.

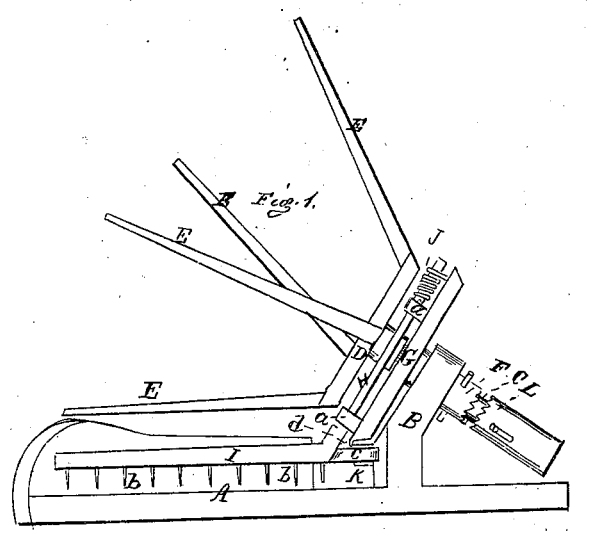

JOHN M. LONG, OF HAMILTON, OHIO.

Letters Patent No. 64,888, dated May 21, 1867.

---

IMPROVEMENT IN HARVESTER-RAKES.

---

The Schedule referred to in these Letters Patent and making part of the same.

---

TO ALL WHOM IT MAY CONCERN:

Be it known that I, JOHN M. LONG, of Hamilton, in the county of Butler, and State of Ohio, have invented a new and improved Raking Device for Harvesters; and I do hereby declare that the following is a full, clear, and exact description thereof, which will enable others skilled in the art to make and use the same, reference being had to the accompanying drawings, forming part of this specification, in which—

Figures 1 and 2 are front views of my invention.

Figure 3 a front view of the same partly in section.

Similar letters of reference indicate like parts.

This invention relates to a new and improved automatic raking device for harvesters, and it consists in arranging the arms or beaters, and also the rake, in such a manner that they may be operated by a very simple means and so as to work in a very efficient manner, the complicated mechanism heretofore employed in these devices being wholly avoided.

A represents the platform of a harvester, which is of quadrant form, and B is a bearing at the inner end of the platform, in which bearing a shaft, C, is placed in an inclined position at an angle of about forty-five degrees. At one end of the shaft C, the end which is over the platform A, there is attached a circular disk, D, having four arms or beaters E secured to its periphery at equal distances apart, and projecting from it at such an angle that they will, as the shaft C rotates and they come over the front end of the platform, be about parallel therewith. On the shaft C there is placed a loose sleeve, F, which also works in the bearing B, or is allowed to rotately freely therein. This sleeve F also has a circular disk, G, upon it, and said disk has two bearings $a\ a$ secured to its outer surface at the rear side of the disk D, in which bearings a shaft, H, is fitted and allowed to turn freely. To one end of this shaft the rake-head I is attached. This head I is provided with teeth $b$ of the usual or any proper kind, and the inner end of the rake-head has an arm, $c$, attached to it, which, when the rake is not at work, is kept against a pin or stop, $d$, on the periphery of the disk G by a coil spring, J, on shaft H, and when the rake-head I is in that position it projects directly outward from the disk G. K is a projection at the inner side of the bearing B, the side facing the platform, and when the sleeve F is rotated the arm $c$ of the rake-head will come in contact with this projection and cause the rake to sweep over the platform and discharge the cut grain therefrom at its rear end, the spring J throwing the rake back to its original position, so that the arm $c$ of the rake-head will come in contact with the pin or stop $d$ as soon as the arm $c$ leaves or passes the projection K. Thus, by this simple arrangement, a very efficient raking device is obtained. The arms or beaters E throw the grain as it is cut upon the platform A, but, as they are rigidly attached to their disk D, they rise from the platform so as to clear the grain thereon as soon as they pass its front edge. The sleeve F is rotated from the shaft C by means of a clutch, L, and the rake and beaters may be operated continuously and simultaneously with each other, or the rake be operated intermittingly, as may be required, the clutch L being adjusted or actuated to effect that result.

I claim as new, and desire to secure by Letters Patent—

1. The rake-head I attached to a shaft, H, on a disk, G, having an inclined axis, and arranged with a spring, J, to operate in the manner substantially as and for the purpose specified.

2. The sleeve F placed loosely on the shaft C, in connection with the clutch L, when said parts are used in connection with the rake and beaters, in the manner substantially as and for the purpose set forth.

JOHN M. LONG.

Witnesses:
P. C. CONKLIN,
ISRAEL WILLIAMS.